(12) United States Patent
Milanfar et al.

(10) Patent No.: US 7,889,950 B2
(45) Date of Patent: Feb. 15, 2011

(54) KERNEL REGRESSION FOR IMAGE PROCESSING AND RECONSTRUCTION

(75) Inventors: Peyman Milanfar, Menlo Park, CA (US); Hiroyuki Takeda, Santa Cruz, CA (US); Sina Farslu, Santa Cruz, CA (US)

(73) Assignee: The Regents of the University of California, Santa Cruz, Oakland, CA (US)

( * ) Notice: Subject to any disclaimer, the term of this patent is extended or adjusted under 35 U.S.C. 154(b) by 1184 days.

(21) Appl. No.: 11/513,833

(22) Filed: Aug. 30, 2006

(65) Prior Publication Data
US 2007/0047838 A1  Mar. 1, 2007

Related U.S. Application Data

(60) Provisional application No. 60/712,890, filed on Aug. 30, 2005, provisional application No. 60/713,045, filed on Aug. 30, 2005.

(51) Int. Cl.
*G06K 9/32* (2006.01)
*H04N 7/01* (2006.01)
*H04N 5/00* (2006.01)

(52) U.S. Cl. .................. 382/300; 348/624; 348/441

(58) Field of Classification Search .................. 382/300; 348/624
See application file for complete search history.

(56) References Cited

U.S. PATENT DOCUMENTS

| 5,343,309 | A | 8/1994 | Roetling |
| 5,717,766 | A | 2/1998 | Azoulay et al. |
| 6,067,125 | A | 5/2000 | May |
| 6,373,590 | B1 | 4/2002 | Ancin et al. |
| 6,456,339 | B1 | 9/2002 | Surati et al. |
| 6,577,312 | B2 | 6/2003 | Deering et al. |
| 6,697,534 | B1 | 2/2004 | Tan et al. |
| 2005/0057687 | A1* | 3/2005 | Irani et al. .................. 348/443 |
| 2005/0280739 | A1* | 12/2005 | Lin et al. ..................... 348/607 |
| 2005/0286764 | A1* | 12/2005 | Mittal et al. ................. 382/181 |

OTHER PUBLICATIONS

Knutsson, Hans and Westin, Carl-Fredrik "Normalized and Differential Convolution" (1993) IEEE pp. 515-523.
Pham, Tuan et al. "Robust Fusion of Irregularly Sampled Data Using Adaptive Normalized Convolution" (2006) EURASIP Journal on Applied Signal Processing, pp. 1-12.

* cited by examiner

*Primary Examiner*—Bhavesh M Mehta
*Assistant Examiner*—Hadi Akhavannik
(74) *Attorney, Agent, or Firm*—Lumen Patent Firm

(57) ABSTRACT

A method of image processing using kernel regression is provided. An image gradient is estimated from original data that is analyzed for local structures by computing a scaling parameter, a rotation parameter and an elongation parameter using singular value decomposition on local gradients of the estimated gradients locally to provide steering matrices. A steering kernel regression having steering matrices is applied to the original data to provide a reconstructed image and new image gradients. The new gradients are analyzed using singular value decomposition to provide new steering matrices. The steering kernel regression with the new steering matrices is applied to the noisy data to provide a new reconstructed image and further new gradients. The last two steps are repeated up to ten iterations to denoise the original noisy data and improve the local image structure.

8 Claims, 13 Drawing Sheets

(a)

(b)

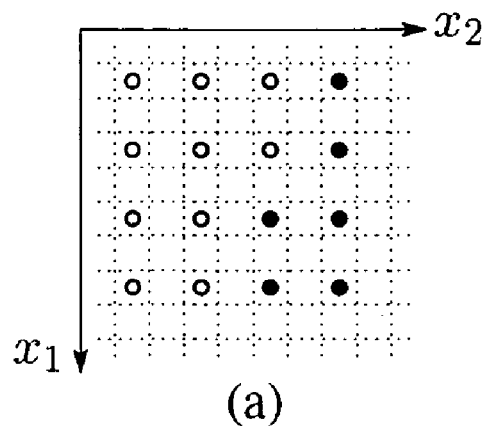
(a)
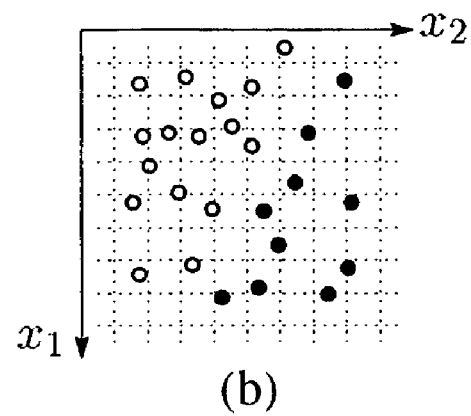
(b)
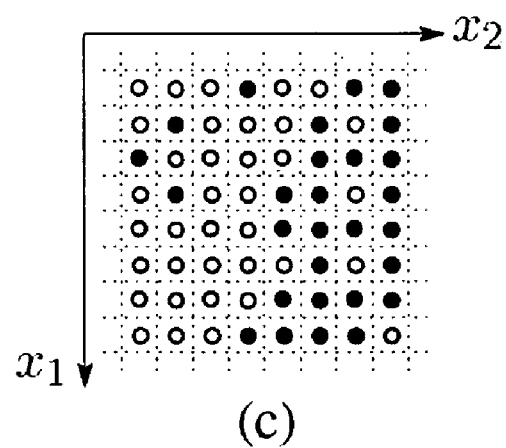
(c)
FIG. 1

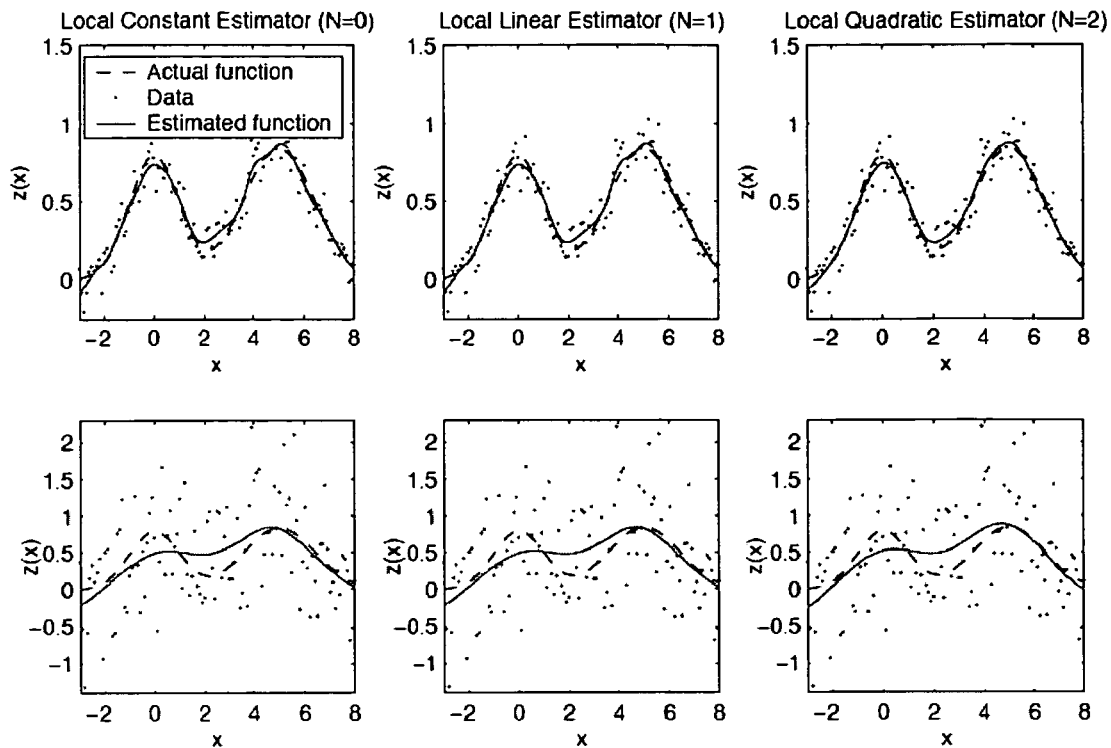
FIG. 3
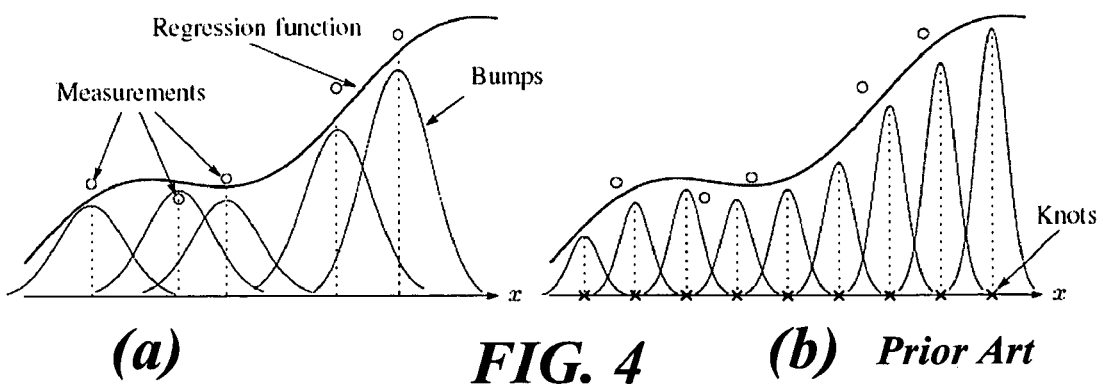
(a) FIG. 4 (b) *Prior Art*

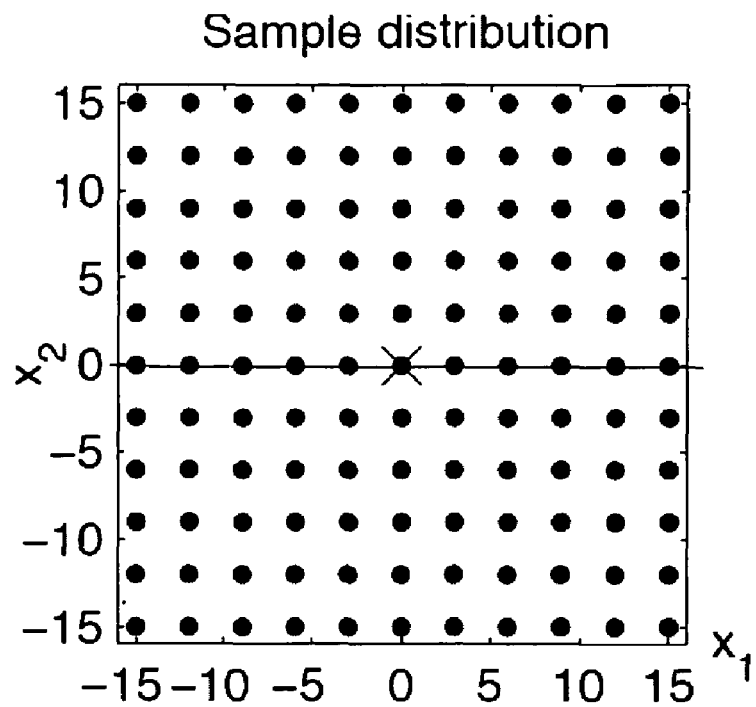
(a)
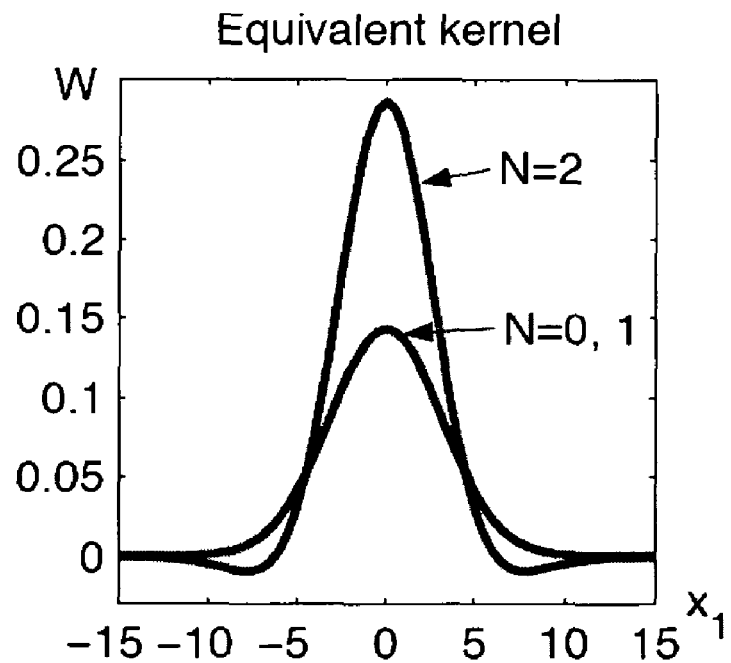
(b)
FIG. 5

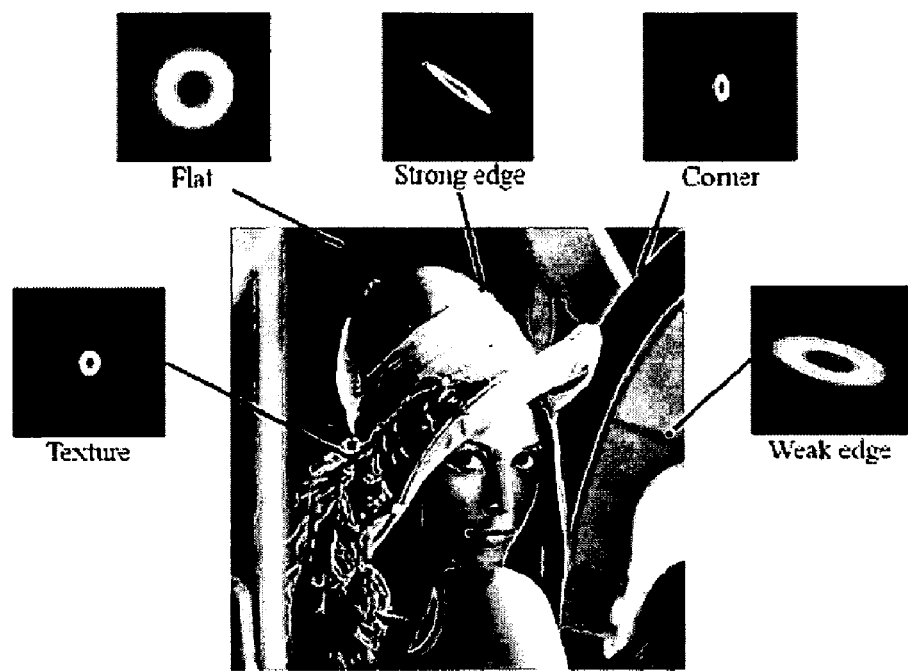
(a)
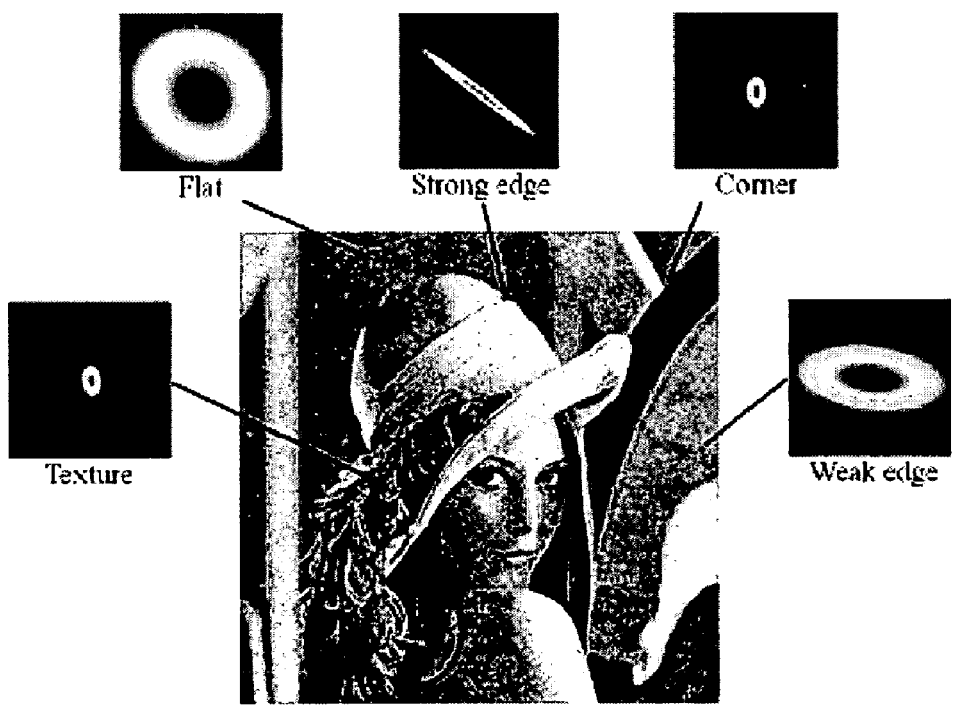
(b)
FIG. 12

  
(a) (b) (c)
  
(d) (e) (f)
  
(g) (h) (i)
FIG. 13

 
(a) (b)
 
(c) (d)
 
(e) (f)
*FIG. 14*

(a)
(b)
(c)
(d)
(e)        (f)        (g)
*FIG. 15*

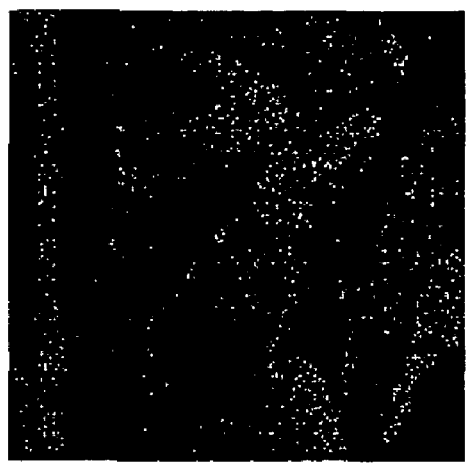 
(a) (b)
 
(c) (d)
 
(e) (f)
*FIG. 16*

 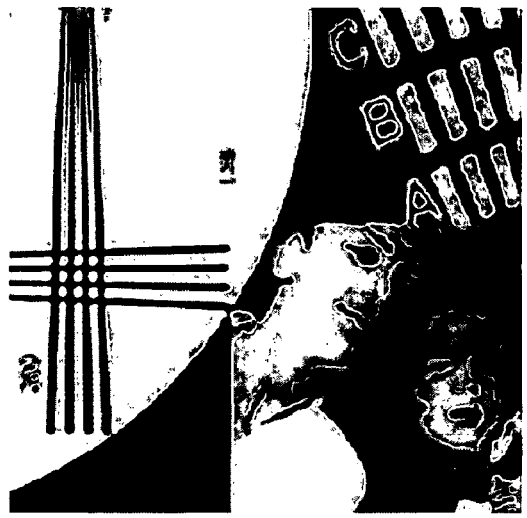
*(a)* *(b)*
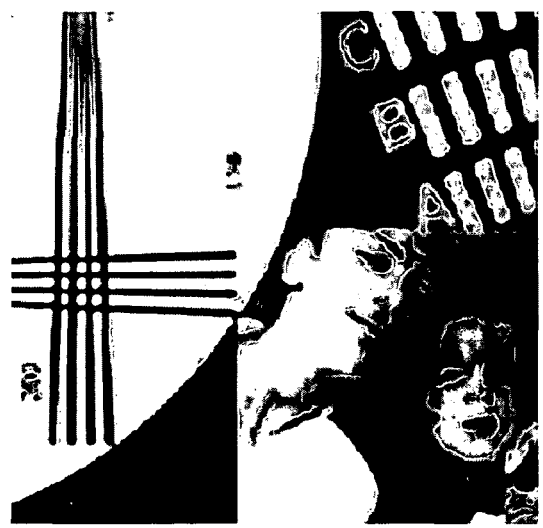 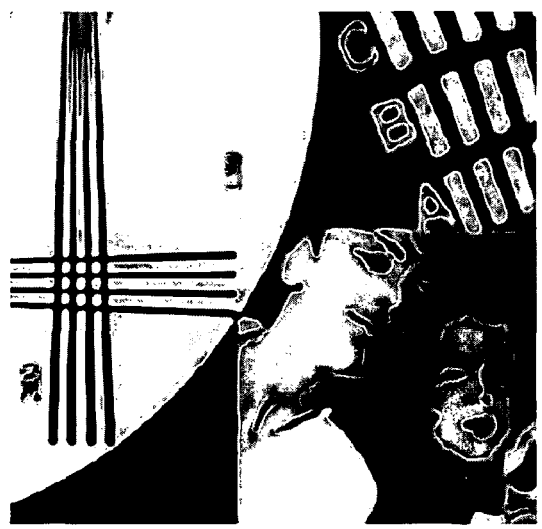
*(c)* *(d)*
FIG. 17

KERNEL REGRESSION FOR IMAGE PROCESSING AND RECONSTRUCTION

CROSS-REFERENCE TO RELATED APPLICATIONS

This application is cross-referenced to and claims the benefit from U.S. Provisional Applications 60/712890 and 60/713045, both filed Aug. 30, 2005, and which are hereby incorporated by reference.

STATEMENT REGARDING FEDERALLY SPONSORED RESEARCH OR DEVELOPMENT

The present invention was supported in part by grant number F49620-03-1-0387 from the Air Force of Scientific Research. The U.S. Government has certain rights in the invention.

FIELD OF THE INVENTION

The invention relates generally to image processing. More particularly, the invention relates to image denoising, upscaling, and interpolation using adaptive kernel regression methods.

BACKGROUND

The ease of use and cost efficiency have contributed to the growing popularity of digital imaging systems. However, inferior spatial resolution with respect to the traditional film cameras is still a drawback. The apparent aliasing effects often seen in digital images are due to the limited number of CCD pixels used in commercial digital cameras. Using denser CCD arrays (with smaller pixels) not only increases the production cost but also results in noisier images. As a cost efficient alternate, image processing methods have been exploited through the years to improve the quality of digital images. Regression methods that attempt to recover the noiseless high-frequency information corrupted by the limitations of imaging system have been attempted, as well as the degradations processes such as compression.

Besides in-painting applications, interpolation of irregularly sampled image data is essential for applications such as multi-frame super-resolution, where several low-resolution images are fused (interlaced) onto a high-resolution grid. "Denoising" is a special case of the regression problem where samples at all desired pixel locations are given but these samples are corrupted, and are to be restored.

Many methods have been proposed to provide improved images, such as B-spline interpolation, orthogonal series methods, and cubic spline interpolation techniques to name a few. Currently there does not exist a single method that is reliable for image denoising (Gaussian, Film grain, and compression artifacts) and image interpolation (upscaling, image reconstruction from irregularly sampled data sets, and super-resolution). There does not exist one single set of techniques to cover many deficient areas of image reconstruction applications.

Accordingly, there is a need to develop a single method that is reliable for image denoising and image interpolation to overcome the current shortcomings in the art.

SUMMARY OF THE INVENTION

The present invention provides a method of image processing using kernel regression and image interpolation for image reconstruction. An original-data image is processed for estimating locally dominant orientations of luminance created by image features, such as edges, corners and smooth areas, using a classic kernel regression technique to provide local image structure data. The local image structure data is analyzed and a scaling parameter, a rotation parameter and an elongation parameter are computed by applying a singular value decomposition to the local gradient estimates, where a steering kernel, or matrix, is then determined. A steering kernel regression having the steering matrix is applied to the original data and a reconstructed image outcome with new local gradients in the image is then provided. The steps of computing the scaling, rotation and elongation parameters, and applying the steering kernel regression are repeated iteratively to each new reconstructed image outcome for up to ten iterations, where each image has gradients containing local image structure information and each iteration improves the gradient and pixel values of each successive reconstructed image to denoise the original noisy data and improve the local image structure information in the reconstructed images.

In one embodiment of the invention, the estimated gradients contain edge structure information (scaling, elongation, and rotation parameters). The gradients are iteratively updated (estimated) by steering kernel regression, and each iteration improves both the pixel values and their gradients. The better gradients yield better edge structure information, where each iteration of the steering kernel regression provides improved estimates.

In one aspect of the invention, the iteration directly uses estimated gradient vectors of an $i^{th}$ iteration to compute local singular values in an $(i^{th}+1)$ iteration for improved reliability.

In another aspect of the invention, an L1 norm is used in the kernel regression, where image noise has sporadic properties such as salt and pepper noise.

In another aspect of the invention the size of the steering kernel is changed using an original sample density and original image contents for making the footprint of the steering kernel bigger in image areas of low sample density, and making the footprint or the steering kernel smaller in image areas of large sample density. In another aspect of the invention, the footprint of said steering kernel is made bigger in image areas of low image structure (i.e. smooth texture-less) and made smaller in areas of high image structure (i.e. textured), where the size of the footprint of the steering kernel is determined by a scaling parameter obtained by a geometric mean of singular values of the previous image in the iteration.

In one aspect of the invention, the image denoising comprises Gaussian, Film grain, and compression artifacts.

In another aspect of the invention, the image interpolation uses upscaling and image reconstruction from irregularly sampled data sets, and super-resolution.

In one embodiment of the current invention, kernel regression for image processing is used, where an image gradient from an image having original data is estimated. Local structures of the image are analyzed and a scaling parameter, a rotation parameter and an elongation parameter are computed by applying singular value decomposition to local gradients of the estimated image gradient to provide a steering kernel. A steering kernel regression having a steering kernel is applied to the original noisy data of the image to provide a reconstructed image having new image gradients. The local image structures of the new image gradients are analyzed and new steering kernels are provided. The steering kernel regression having the new steering matrices is applied to noisy data of the reconstructed image (or the original noisy data) and a new reconstructed image is provided having further new gradients. The steps of analyzing local image structures of each new image and applying the steering kernel regression is repeated up to ten iterations to denoise the given noisy data and improve the local image structure information in the reconstructed images.

BRIEF DESCRIPTION OF THE FIGURES

The objectives and advantages of the present invention will be understood by reading the following detailed description in conjunction with the drawing, in which:

FIGS. 1a-c show interpolation of regularly sampled data, reconstruction from irregularly sampled data, and denoising.

FIG. 3 shows examples of local polynomial regression on an equally-spaced noisy data set.

FIGS. 4a, b show a comparison of the position of knots in (a) Kernel regression and (b) classical B-Spline methods.

FIGS. 5a, b show a uniformly sampled data set and a horizontal slice of the equivalent kernels.

FIGS. 12a, b show (a) the estimated kernel footprints in a noiseless image and (b) the estimated footprints for the same areas of a noisy image.

FIGS. 13a-i show the performance of different denoising methods are compare.

FIGS. 14a-f show the performance of different denoising methods are compared on a compressed image by JPEG format.

FIGS. 15a-g show the performance of different denoising methods on a color image with real noise.

FIGS. 16a-f show irregularly sampled data interpolation using different methods.

FIGS. 17a-d show image fusion (Super-Resolution) methods of a real data set.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 2:
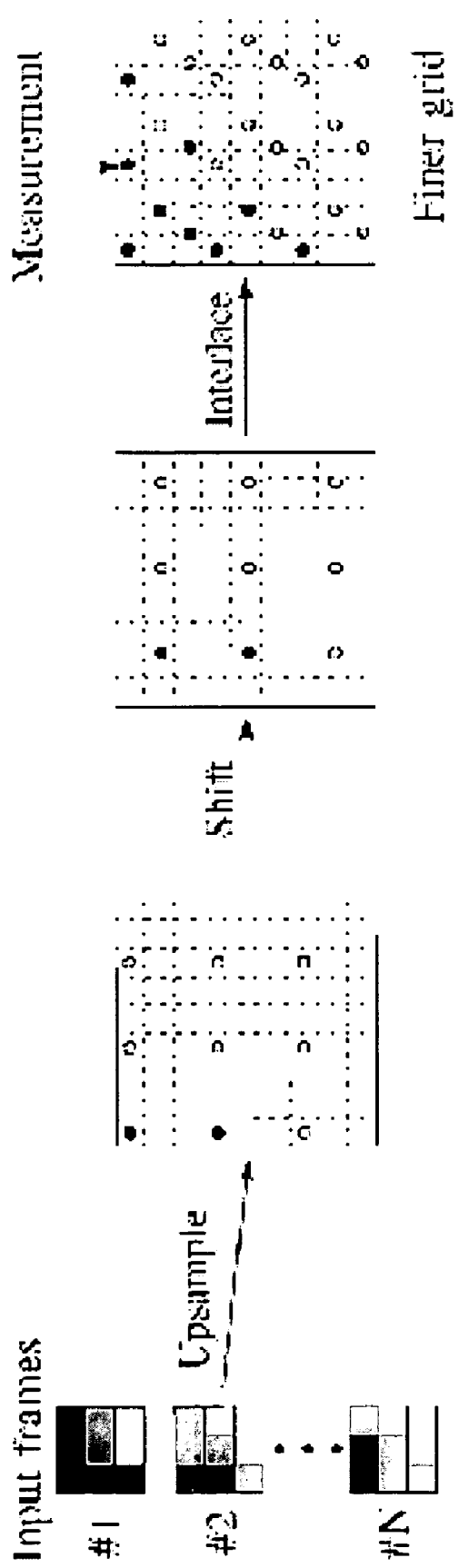
FIG. 2 shows image fusion that often yields irregularly sampled data.

Regression is a tool not only for interpolation of regularly sampled frames (up-sampling) but also for restoration and enhancement of noisy and possibly irregularly sampled images. FIG. 1(a) illustrates an example of the interpolation, where an image is up-sampled by a factor of two in each direction. FIG. 1(b) illustrates an example of restoration, where an irregularly sampled noisy image is to be interpolated onto a high resolution grid. Different from in-painting applications, interpolation of irregularly sampled image data is essential for applications such as multi-frame super-resolution, where several low-resolution images are fused (interlaced) onto a high-resolution grid. FIG. 2 represents a block diagram of a super-resolution algorithm. Note that "denoising" is a special case of the regression problem where samples at all desired pixel locations are given (depicted in FIG. 1(c)), but these samples are corrupted, and are to be restored.

Classical parametric image processing methods rely on a specific model of the signal of interest, and seek to compute the parameters of this model in the presence of noise. Examples of this approach are presented in diverse problems ranging from denoising to upscaling and interpolation. A generative model based upon the estimated parameters is then produced as the best estimate of the underlying signal.

In contrast to the parametric methods, non-parametric methods rely on the data itself to dictate the structure of the model, in which case this implicit model is referred to as a regression function. With the relatively recent emergence of machine learning methods, kernel methods have become well-known and used frequently for pattern detection and discrimination problems. Non-parametric estimation, or kernel regression, are not widely recognized or used in the image and video processing literature. In the one dimensional case where the measured data are given by $$y_i = z(x_i) + \epsilon_i, \; i=1, 2, \ldots, P$$

where $z(\cdot)$ is the (hitherto unspecified) regression function and $\epsilon_i$'s are the independent and identically distributed zero mean noise values (with otherwise no particular statistical distribution assumed). As such, kernel regression provides a rich mechanism for computing point-wise estimates of the function with minimal assumptions about global signal or noise models. While the specific form of $z(x_i)$ may remain unspecified, if it is assumed to be locally smooth to some order N, then in order to estimate the value of the function at any point x given the data, we can rely on a generic local expansion of the function about this point. Specifically, if x is near the sample at $x_i$, we have the N-term Taylor series $$z(x_i) \approx z(x) + z'(x)(x_i - x) + \frac{1}{2!}z''(x)(x_i - x)^2 + \cdots + \frac{1}{N!}z^{(N)}(x)(x_i - x)^N$$
$$= \beta_0 + \beta_1(x_i - x) + \beta_2(x_i - x)^2 + \cdots + \beta_N(x_i - x)^N.$$

The above suggests that if the Taylor series is considered as a local representation of the regression function, estimating the parameter $\beta_0$ can yield the desired (local) estimate of the regression function based on the data. The parameters $\{\beta_n\}_{n=1}^{N}$ will provide localized information on the n-th derivatives of the regression function. This approach is based on local approximations and the next step is to estimate the parameters $\{\beta_n\}_{n=0}^{N}$ from the data while giving the nearby samples higher weight than samples farther away. A least-squares formulation capturing this idea is to solve the following optimization problem, $$\min_{\{\beta_n\}} \sum_{i=1}^{P} [y_i - \beta_0 - \beta_1(x_i - x) - \beta_2(x_i - x)^2 - \cdots - \beta_N(x_i - x)^N]^2 \frac{1}{h} K\left(\frac{x_i - x}{h}\right)$$

where $K(\cdot)$ is the kernel function which penalizes distance away from the local position where the approximation is centered, and the smoothing parameter h (also called the "bandwidth") controls the strength of this penalty. In particular, the function K is a symmetric function which attains its maximum at zero, satisfying $\int_R tK(t)dt = 0, \int_R t^2 K(t)dt = c$ where c is some constant value. In the current invention, the only conditions needed for the regression framework are that the kernel function be non-negative, symmetric and unimodal. The choice of the particular form of the function K is open, and may be selected as a Gaussian, exponential, or other forms which comply with the above constraints. For the case of classic regression the choice of the kernel has only a small effect on the accuracy of estimation and therefore preference is given to the differentiable kernels with low computational complexity such as the Gaussian kernel.

In the current invention, the above structure allows for tailoring the estimation problem to the local characteristics of the data, unlike the standard parametric model that is generally intended as a more global fit. In the estimation of the local structure, higher weight is given to the nearby data as compared to samples that are farther away from the center of the analysis window. This approach does not specifically require that the data follow a regular or equally spaced sampling structure. As long as the samples are near the point x, the framework is valid. This is in contrast to the general parametric approach which generally either does not directly take the location of the data samples into account, or relies on regular sampling over a grid. The approach according to the current invention is both useful for denoising, and equally viable for interpolation of sampled data at points where no actual samples exist. Thus, the kernel-based methods of the current invention are well-suited for a wide class of image processing problems of practical interest.

Returning to the optimization problem $$\min_{\{\beta_n\}} \sum_{i=1}^{P} [y_i - \beta_0 - \beta_1(x_i - x) - \beta_2(x_i - x)^2 - \cdots - \beta_N(x_i - x)^N]^2 \frac{1}{h} K\left(\frac{x_i - x}{h}\right)$$

one can choose the order N to effect an increasingly more complex local approximation of the signal. Locally constant, linear, and quadratic approximations (corresponding to N=0, 1, 2) have been considered most widely, and in particular, choosing N=0, a locally linear adaptive filter is obtained, which is known as the Nadaraya-Watson Estimator (NWE). Specifically, this estimator has the form $$\hat{z}(x) = \frac{\sum_{i=1}^{P} K_h(x_i - x) y_i}{\sum_{i=1}^{P} K_h(x_i - x)}, \quad K_h(t) = \frac{1}{h} K\left(\frac{t}{h}\right)$$

The NWE is the simplest manifestation of an adaptive filter resulting from the kernel regression framework.

Higher order approximations (N>0) are also possible. The choice of order in parallel with the smoothness (h) affects the bias and variance of the estimate. In general, lower order approximates, such as NWE, result in smoother images (large bias and small variance) as there are fewer degrees of freedom. Conversely, over-fitting happens in regressions using higher orders of approximation, resulting in small bias and large estimation variance. Further, smaller values for h result in small bias and consequently large variance in estimates.

The performance of kernel regressors of different orders is compared in the illustrative examples of FIG. 3, where shown are examples of local polynomial regression on an equally-spaced data set. The signals in the first and second rows are contaminated with the Gaussian noise of SNR=9 [dB] and −6.5 [dB], respectively, where variance of the additive Gaussian noise is 0.1. and a smoothing parameter is chosen by the cross validation method. The dashed, solid lines, and dots represent the actual function, estimated function, and the noisy data, respectively. The columns from left to right show the constant, linear, and quadratic interpolation results, respectively. Corresponding root mean squared error's (RMSE) for the first row experiments are 0.0364, 0.0364, 0.0307 and for the second row are as 0.1697, 0.1708, 0.1703.

In the first experiment, illustrated in the first row of FIG. 3, a set of moderately noisy regularly sampled data are used to estimate the underlying function. Here, the computationally more complex high order interpolation (N=2) results in a better estimate than the lower ordered interpolators (N=0 or N=1). The presented quantitative comparison of the RMSE's supports this assertion. The second experiment, illustrated in the second row, shows that for the heavily noisy data sets (variance of the additive Gaussian noise 0.5), the performance of lower order regressors is better. Note that the performance of the N=0 and N=1 ordered estimators for these equally-spaced sampled experiments are identical.

There are several other regression methods such as B-spline interpolation, orthogonal series, cubic spline interpolation and spline smoother.

In orthogonal series methods, instead of using Taylor series, the regression function z can be represented by a linear combination of other basis functions, such as Legendre polynomials, wavelet bases, Hermite polynomials, etc. In the 1-D case, such a model in general is represented as $$z(x) = \sum_{j=0}^{N} \beta_j \varphi_j(x)$$

The coefficients $\{\beta_j\}_{j=0}^{N}$ are the unknown parameters desired to estimate.

Following the notation used in the previous subsection, the B-spline regression is expressed as the linear combination of shifted spline functions $B^q(\cdot)$ $$z(x) = \sum_k \beta_k B^q(x - k)$$

where the qth order B-spline function is defined as a q+1 times convolution of the zero order B-spline, $$B^q(x) = \underbrace{B^0(x) * B^0(x) * \cdots * B^0(x)}_{q+1}; \quad \text{where } B^0(x) = \begin{cases} 1, & -\frac{1}{2} < x < \frac{1}{2} \\ \frac{1}{2}, & |x| = \frac{1}{2} \\ 0, & \text{else} \end{cases}$$

The scalar k in the linear combination of shifted spline functions, often referred to as the knot, defines the center of a spline. Least-squares is usually exploited to estimate the B-spline coefficients $\{\beta k\}$.

The B-spline interpolation method bears some similarities to the kernel regression method. One major difference between these methods is in the number and position of the knots as illustrated in FIG. 4. While in the classical B-Spline method the knots are located in equally spaced positions, in the case of kernel regression the knots are implicitly located on the sample positions. A related method, the Non-Uniform Rational B-Spline is also proposed to address this shortcoming of the classical B-Spline method, by irregularly positioning the knots with respect to the underlying signal.

Cubic spline interpolation technique is one of the most popular members of the spline interpolation family which is based on fitting a polynomial between any pair of consecutive data. Assuming that the second derivative of the regression function exists, cubic spline interpolator is defined as $$z(x) = \beta_0(i) + \beta_1(i)(x_i - x) + \beta_2(i)(x_i - x)^2 + \beta_3(i)(x_i - x)^3,$$
$$x \in [x_i, x_{i+1}]$$

where under following boundary conditions $$z(x)|_{x=-x_i} = z(x)|_{x=+x_i}, \, z'(x)|_{x=-x_i} = z'(x)|_{x=+x_i}, \, z''(x)|_{x=-x_i} = z''(x)|_{x=+x_i}, \, z''(x_1) = z''(xp) = 0,$$

all the coefficients ($\beta_n(i)$'s) can be uniquely defined.

Note that an estimated curve by cubic spline interpolation passes through all data points which is ideal for the noiseless data case. However, in most practical applications, data is contaminated with noise and therefore such perfect fits are no longer desirable. Consequently a related method called spline smoother has been proposed. In spline smoothing method the above hard conditions are replaced with soft ones, by introducing them as Bayesian priors which penalize rather than constrain non-smoothness in the interpolated images. A popular implementation of the spline smoother is given by $$\hat{z}(x) = \arg\min_{z(x)} \left[ \sum_{i=1}^{P} \{y_i - z(x_i)\}^2 + \lambda \|z''\|_2^2 \right], \quad \|z''\|_2^2 = \int \{z''(x)\}^2 dx$$

where $z(xi)$ can be replaced by either the linear combination of shifted spline functions or any orthogonal series, and $\lambda$ is the regularization parameter. Note that assuming a continuous sample density function, the solution to this minimization problem is equivalent to NWE, with the following kernel function and smoothing parameter $$K(t) = \frac{1}{2} \exp\left(-\frac{|t|}{\sqrt{2}}\right) \sin\left(\frac{|t|}{\sqrt{2}} + \frac{\pi}{4}\right), \quad h(x_i) = \left(\frac{\lambda}{Pf(x_i)}\right)^{\frac{1}{4}}$$

where f is the density of samples. Therefore, spline smoother is a special form of kernel regression.

Another edge-directed interpolation method for upsampling regularly sampled images has previously been proposed. The interpolation is implemented by weighted averaging the 4 immediate neighboring pixels in a regular upsampling scenario where the filter coefficients are estimated using the classic covariance estimation method.

The normalized convolution method presented is a simplified version of the adaptive kernel regression.

Note that other popular edge adaptive denoising or interpolation techniques have been proposed, such as the PDE based regression methods.

Similar to the 1-D case in, the data measurement model in 2-D is given by $$y_i = z(x_i) + \epsilon_i, \, i = 1, \ldots, P$$

where the coordinates of the measured data $y_i$ is now the 2×1 vector $x_i$. Correspondingly, the local expansion of the regression function is given by $$z(x_i) \approx z(x) + \{\nabla z(x)\}^T (x_i - x) + \frac{1}{2}(x_i - x)^T \{Hz(x)\}(x_i - x) + \cdots$$
$$= z(x) + \{\nabla z(x)\}^T (x_i - x) +$$
$$\frac{1}{2} vec^T \{Hz(x)\} vec\{(x_i - x)(x_i - x)^T\} + \cdots$$

where $\nabla$ and $H$ are the gradient (2×1) and Hessian (2×2) operators, respectively, and vec($\cdot$) is the vectorization operator, which lexicographically orders a matrix into a vector. Defining vech($\cdot$) as the half-vectorization operator of the "lower-triangular" portion of a symmetric matrix, e.g., $$vech\left(\begin{bmatrix} a & b \\ b & d \end{bmatrix}\right) = [a \, b \, d]^T,$$

$$vech\left(\begin{bmatrix} a & b & c \\ b & e & f \\ c & f & i \end{bmatrix}\right) = [a \, b \, c \, e \, f \, i]^T$$

and considering the symmetry of the Hessian matrix, the regression function above simplifies to $$z(x_i) \approx \beta_0 + \beta_1^T (x_i - x) + \beta_2^T vech\{(x_i - x)(x_i - x)^T\} + \ldots$$

$\beta_0 = z(x)$ is thus the pixel value of interest and the vectors $\beta_1$ and $\beta_2$ are $$\beta_1 = \nabla z(x) = \left[\frac{\partial z(x)}{\partial x_1}, \frac{\partial z(x)}{\partial x_2}\right]^T,$$

$$\beta_2 = \frac{1}{2}\left[\frac{\partial^2 z(x)}{\partial x_1^2}, 2\frac{\partial^2 z(x)}{\partial x_1 \partial x_2}, \frac{\partial^2 z(x)}{\partial x_2^2}\right]^T$$

As in the case of univariate data, the $\beta_n$'s are computed from the following optimization problem:

$$\min_{\{\beta_n\}} \sum_{i=1}^{P} [y_i - \beta_0 - \beta_1^T (x_i - x) - \beta_2^T vech\{(x_i - x)(x_i - x)^T\} - \cdots]^2 K_H(x_i - x)$$

with $$K_H(t) = \frac{1}{\det(H)} K(H^{-1} t)$$

where K is the 2-D realization of the kernel function, and H is the 2×2 smoothing matrix. It is also possible to express the above optimization problem in a matrix form as a weighted least-squares optimization problem $$\hat{b} = \arg\min_b \|y - X_x b\|^2_{W_x} = \arg\min_b (y - X_x b)^T W_x (y - X_x b)$$

where $$y = [y_1, y_2, \cdots, y_P]^T, \quad b = [\beta_0, \beta_1^T, \cdots, \beta_N^T]^T,$$

$$W_x = \mathrm{diag}[K_H(x_1 - x), K_H(x_2 - x), \cdots, K_H(x_P - x)],$$

$$X_x = \begin{bmatrix} 1 & (x_1 - x)^T & \mathrm{vech}^T\{(x_1 - x)(x_1 - x)^T\} & \cdots \\ 1 & (x_2 - x)^T & \mathrm{vech}^T\{(x_2 - x)(x_2 - x)^T\} & \cdots \\ \vdots & \vdots & \vdots & \vdots \\ 1 & (x_P - x)^T & \mathrm{vech}^T\{(x_P - x)(x_P - x)^T\} & \cdots \end{bmatrix}$$

with "diag" defining a diagonal matrix.

Regardless of the estimator order (N), since the objective is to compute an estimate of the image (pixel values), the necessary computations are limited to the ones that estimate the parameter $\beta_0$. Therefore, the least-squares estimation is simplified to $$\hat{z}(x) = \hat{\beta}_0 = e_1^T (X_x^T W_x X_x)^{-1} X_x^T W_x y$$

where $e_1$ is a column vector with the first element equal to one, and the rest equal to zero. There is a fundamental difference between computing $\beta_0$ for the N=0 case, and using a high order estimator (N>0) and then effectively discarding direct calculation of all $\beta_n$'s except $\beta_0$, where the latter method computes estimates of pixel values assuming a $N^{th}$ order locally polynomial structure is present.

The current invention uses a computationally more efficient and intuitive solution to the above kernel regression problem. Study of the above simplified least squares estimation shows that $$X_x^T W_x X_x \text{ is a } (N+1) \times (N+1)$$

block matrix, with the following structure:

$$X_x^T W_x X_x = \begin{bmatrix} s_{11} & s_{12} & s_{13} & \cdots \\ s_{21} & s_{22} & s_{23} & \cdots \\ s_{31} & s_{32} & s_{33} & \cdots \\ \vdots & \vdots & \vdots & \ddots \end{bmatrix}$$

where $s_{lm}$ is an l×m matrix (block). The block elements here for orders up to N=2 are as follows:

$$s_{11} = \sum_{i=1}^{P} K_H(x_i - x),$$

$$s_{12} = s_{21}^T = \sum_{i=1}^{P} (x_i - x)^T K_H(x_i - x),$$

$$s_{22} = \sum_{i=1}^{P} (x_i - x)(x_i - x)^T K_H(x_i - x),$$

-continued $$s_{13} = s_{31}^T = \sum_{i=1}^{P} \mathrm{vech}^T\{(x_i - x)(x_i - x)^T\} K_H(x_i - x),$$

$$s_{23} = s_{32}^T = \sum_{i=1}^{P} (x_i - x) \mathrm{vech}^T\{(x_i - x)(x_i - x)^T\} K_H(x_i - x),$$

$$s_{33} = \sum^{P} \mathrm{vech}\{(x_i - x)(x_i - x)^T\} \mathrm{vech}^T\{(x_i - x)(x_i - x)^T\} K_H(x_i - x)$$

Considering the above shorthand notations, the above simplified least squares estimation can be represented as a local linear filtering process:

$$\hat{z}(x) = \sum_{i=1}^{P} W_i(x; N, H) y_i$$

where $$W_i(x; 0, H) = \frac{K_H(x_i - x)}{s_{11}}$$

$$W_i(x; 1, H) = \frac{\{1 - s_{12} s_{22}^{-1}(x_i - x)\} K_H(x_i - x)}{s_{11} - s_{12} s_{22}^{-1} s_{21}}$$

$$W_i(x; 2, H) = \frac{\begin{bmatrix} 1 - S_{12} S_{22}^{-1}(x_i - x) - \\ S_{13} S_{33}^{-1} \mathrm{vech}\{(x_i - x)(x_i - x)^T\} \end{bmatrix} K_H(x_i - x)}{s_{11} - S_{12} S_{22}^{-1} s_{21} - S_{13} S_{33}^{-1} s_{31}}$$

and $$S_{12} = s_{12} - s_{13} s_{33}^{-1} s_{32}, \quad S_{22} = s_{22} - s_{23} s_{33}^{-1} s_{32}, \quad S_{13} = s_{13} - s_{12} s_{22}^{-1} s_{23}, \quad S_{33} = s_{33} - s_{32} s_{22}^{-1} s_{23}$$

Therefore, regardless of the order, the classical kernel regression is nothing but local weighted averaging of data (linear filtering), where the order determines the type and complexity of the weighting scheme. This also suggests that higher order regressions (N>0) are equivalents of the zero order regression (N=0) but with a more complex kernel function. Here, to effect the higher order regressions, the original kernel $K_H$ (xi-x) is modified to yield a newly adapted "equivalent" kernel shown in FIG. 5, which illustrates a uniformly sampled data set, and a horizontal cross section of its corresponding equivalent kernels for the regression orders N=0, 1, and 2. The direct result of a symmetry condition on $K_H(x_i-x)$ with uniformly sampled data is that all odd-order moments ($s_{2j,2k+1}$ and $s_{2k+1,2j}$)'s consist of elements with values very close to zero. Therefore, as noted in FIG. 5(b) the kernels for N=0, and N=1 are essentially identical. As this observation holds for all regression orders, for the regularly sampled data, the N=2q−1 order regression of the current invention is preferred to the computationally more complex N=2q order regression, as they produce the same results. This property manifests itself in FIG. 5, where the N=0 or N=1 ordered equivalent kernels are identical.

Figure 6:
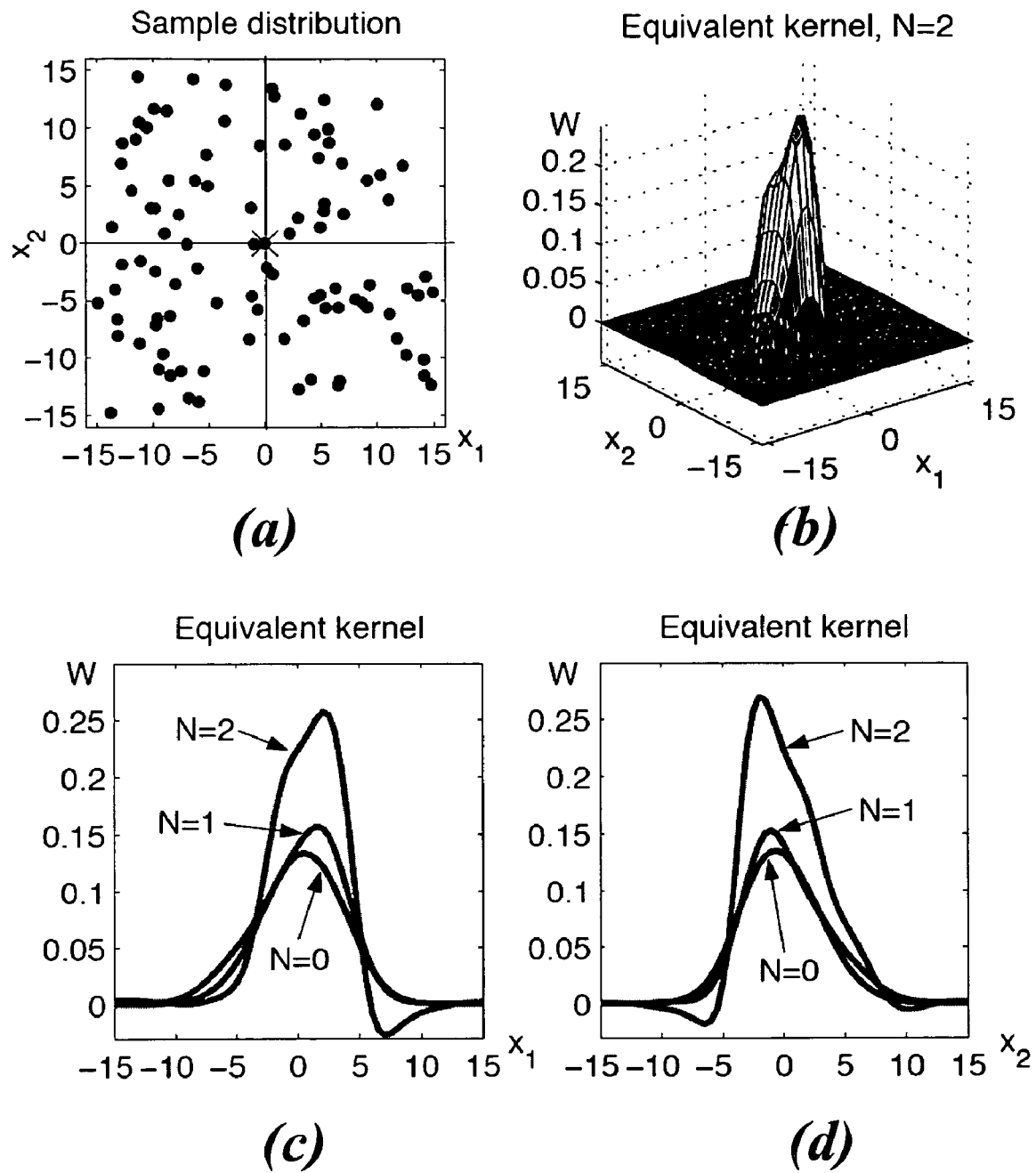
FIGS. 6a-d show equivalent kernels for an irregularly sampled data set in 6(a), a second order (N=2) equivalent kernel in 6(b), the horizontal and vertical slices of the equivalent kernels of different orders (N=0, 1, 2) are compared in 6(c) and 6(d).

FIG. 6(a) depicts a comparison of equivalent kernels for an irregularly sampled data set. The N=2 ordered equivalent kernel for the sample marked with "x", is shown in FIG. 6(b). FIG. 6(c) and FIG. 6(d) show the horizontal and vertical cross sections of this kernel, respectively. FIG. 6 demonstrates the fact that the equivalent kernels of the current invention tend to adapt themselves to the density of available samples. Also, unlike the uniformly sampled data case, since the odd-order moments are nonzero, the N=0 and N=1 equivalent kernels are no longer identical.

Figure 7:
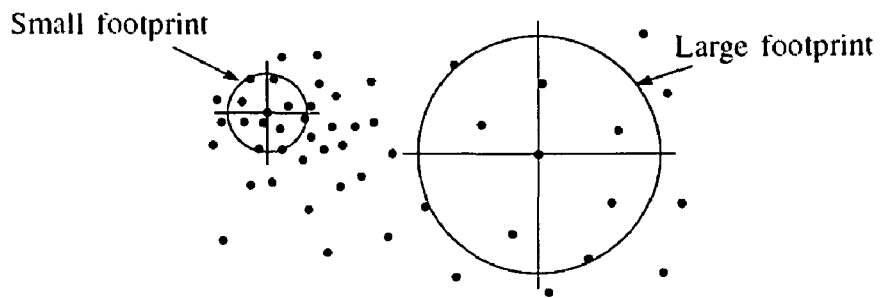
FIG. 7 shows smoothing (kernel size) selection by sample density according to the present invention.

The shape of the regression kernel $$K_H(t) = \frac{1}{\det(H)} K(H^{-1}t)$$

and consequently the performance of the estimator, depend on the choice of the smoothing matrix H. For the bivariate data cases, the smoothing matrix (H) is 2×2, and it extends the support of the regression kernel to contain "enough" samples. As illustrated in FIG. 7, the current invention uses smaller kernels in the areas with more available samples, whereas larger kernels are more suitable for the more sparsely sampled areas of the image.

A cross validation "leave-one-out" method has been used as a technique for estimating the elements of the local $H_i$'s. However, as the cross validation method is computationally very expensive, the current invention uses a simplified and computationally more efficient model of the smoothing kernel as $$H_i = h \mu_i I,$$

where $\mu_i$ is a scalar that captures the local density of data samples (nominally set to $\mu_i=1$) and h is the global smoothing parameter.

The global smoothing parameter is directly computed from the cross validation method, by minimizing the following cost function $$\zeta_{cv}(h) = \frac{1}{P}\sum_{i=1}^{P} \{\hat{z}_i(x_i) - y_i\}^2$$

where $\hat{z}_i(x_i)$ is the estimated pixel value without using the i-th sample at $x_i$. To further reduce the computations, rather than leaving a single sample out, the current invention leaves out a set of samples (a whole row or column).

The local density parameter, $\hat{f}(x)$ is estimated as follows $$\mu_i = \left\{ \frac{\hat{f}(x_i)}{\exp\left(\frac{1}{P}\sum_{i=1}^{P}\log \hat{f}(x_i)\right)} \right\}^{-\alpha}$$

where the sample density, $\hat{f}(x)$, is measured as $$\hat{f}(x) = \frac{1}{P}\sum_{i=1}^{P} K_{H_i}(x_i - x)$$

and $\alpha$, the density sensitivity parameter, is a scaler satisfying $0 < \alpha \leq 1$. As an example, $\alpha=0.5$ can be chosen, which is proved in to be an appropriate overall choice for the density sensitivity parameter. Note that $H_i$ and $\mu_i$ are estimated in an iterative fashion. In the first iteration, we initialize with $\mu_i=1$ and iterate until convergence, up to ten iteration.

The current invention uses a computationally efficient classic kernel regression method that it is equivalent to an adaptive locally linear filtering process. The price that one pays for using such computationally efficient classic kernel regression methods with diagonal matrix Hi is the low quality of reconstruction in the edge areas. Better performance is gained, according to the current invention, by use of data-adapted kernel regression methods which take into account not only the spatial sampling density of the data, but also the actual (pixel) values of those samples. These more sophisticated methods lead to locally adaptive "nonlinear" extensions of classic kernel regression according to the current invention.

One fundamental improvement on the above method can be realized by noting that, the local polynomial kernel regression estimates, independent of the order N, are always local linear combinations of the data. However, they suffer from an inherent limitation due to this local linear action on the data.

Figure 8:
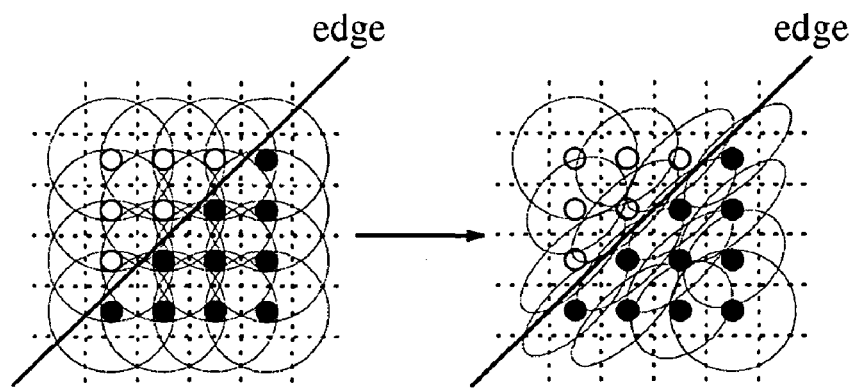
FIGS. 8a, b show kernel spread in a uniformly sampled data set with kernels in the classic method depend only on the sample density in 8(a), data-adapted kernels elongate with respect to the edge in 8(b).

Data-adapted kernel regression methods rely on not only the sample location and density, but also the radiometric properties of these samples. Therefore, the effective size and shape of the regression kernel are adapted locally to image features such as edges. This property is illustrated in FIG. 8, where the classical and adaptive kernel shapes in the presence of an edge are compared.

Data-adapted kernel regression is structured similarly to $$\min_{\{\beta_n\}} \sum_{i=1}^{P} [y_i - \beta_0 - \beta_1^T(x_i - x) - \beta_2^T vech\{(x_i - x)(x_i - x)^T\} - \cdots]^2 K_H(x_i - x)$$

as an optimization problem $$\min_{\{\beta_0\}} \sum_{i=1}^{P} [y_i - \beta_0 - \beta_1^T(x_i - x) - \beta_2^T vech\{(x_i - x)(x_i - x)^T\} - \cdots]^2$$
$$K_{adapt}(x_i - x, y_i - y)$$

where the data-adapted kernel function $K_{adapt}$ now depends on the spatial sample locations $x_i$'s and density as well as the radiometric values $y_i$ of the data.

A simple and intuitive choice of the $K_{adapt}$ is to use separate terms for penalizing the spatial distance between the pixel of interest x and its neighbors $\{x_i\}$, and the radiometric "distance" between the corresponding pixels y and $\{y_i\}$:

$$K_{adapt}(x_i-x, y_i-y) \equiv K_{H_s}(x_i-x) K_{h_r}(y_i-y)$$

where $H_s$ ($=h_s I$) is the spatial smoothing matrix and $h_r$ is the radiometric smoothing scalar. The properties of this adaptive method, or Bilateral Kernel Regression can be better understood by studying the special case of N=0, which results in a data-adapted version of NWE:

$$\hat{z}(x) = \frac{\sum_{i=1}^{P} K_{H_s}(x_i - x) K_{h_r}(y_i - y) y_i}{\sum_{i=1}^{P} K_{H_s}(x_i - x) K_{h_r}(y_i - y)}$$

In general, since the pixel values (y) at an arbitrary position (x) might not be available from the data, the direct application of $$K_{adapt}(x_i-x, y_i-y) \equiv K_{H_s}(x_i-x) K_{h_r}(y_i-y)$$

is limited to the denoising problem. This limitation, however, can be overcome by using an initial estimate of y by an appropriate interpolation technique. The bilateral kernel choice, along with higher order choices for (N>0) will lead to generalizations of the bilateral filter.

Breaking $K_{adapt}$ into spatial and radiometric terms as utilized in the bilateral case weakens the estimator performance since it limits the degrees of freedom and ignores correlations between positions of the pixels and their values. In particular, for very noisy data sets, (yi–y)'s tend to be large and therefore most radiometric weights are very close to zero, and effectively useless. The current invention provides a solution to overcome this drawback of the bilateral kernel.

A filtering procedure according to the current invention takes the above ideas one step further, based upon the earlier non-parametric framework. In particular, the effect of computing $K_h$, $(y_i-y)$ in $$K_{adapt}(x_i-x, y_i-y) = K_{H_s}(x_i-x) K_{h_r}(y_i-y)$$

is to implicitly measure a function of the local gradient estimated between neighboring values, and to use this estimate to weight the respective measurements. As an example, if a pixel is located near an edge, then pixels on the same side of the edge will have much stronger influence in the filtering. The current invention uses a two-step approach where first an initial estimate of the image gradients is made using some kind of gradient estimator (say the second order classic kernel regression method). Next this estimate is used to measure the dominant orientation of the local gradients in the image. In a second filtering stage, this orientation information is then used to adaptively "steer" the local kernel, resulting in elongated, elliptical contours spread along the directions of the local edge structure. With these locally adapted kernels, the denoising is effected most strongly along the edges, rather than across them, resulting in strong preservation of details in the final output. To be more specific, the data-adapted kernel takes the form $$K_{adapt}(x_i-x, y_i-y) = K_{H_i^{steer}}(x_i-x)$$

where $H_i$'s are now the data-dependent full matrices which we call steering kernels or matrices, defined as $$H_i^{steer} = h\mu_i C_i^{-\frac{1}{2}}$$

where $C_i$'s are (symmetric) covariance matrices based on differences in the local gray-values. A good choice for $C_i$'s will effectively spread the kernel function along the local edges as shown in FIG. 8. Note, that even by choosing a large h in order to have a strong denoising effect, the undesirable blurring effect which would otherwise have resulted is tempered around edges with appropriate choice of Ci's. With such steering matrices, for example, if a Gaussian kernel is used, the steering kernel is mathematically represented as $$K_{H_i^{steer}}(x_i - x) = \frac{\sqrt{\det(C_i)}}{2\pi h^2 \mu_i^2} \exp\left\{-\frac{(x_i-x)^T C_i (x_i-x)}{2h^2 \mu_i^2}\right\}$$

The local edge structure is related to the gradient covariance (or equivalently, the locally dominant orientation), where an estimate of this covariance matrix may be obtained as follows:

$$\hat{C}_i \approx \begin{bmatrix} \sum_{x_j \in w_i} z_{x_1}(x_j)z_{x_1}(x_j) & \sum_{x_j \in w_i} z_{x_1}(x_j)z_{x_2}(x_j) \\ \sum_{x_j \in w_i} z_{x_1}(x_j)z_{x_2}(x_j) & \sum_{x_j \in w_i} z_{x_2}(x_j)z_{x_2}(x_j) \end{bmatrix}$$

where $z_{x_1}(\cdot)$ and $z_{x_2}(\cdot)$ are the first derivatives along $x_1$ and $x_2$ directions and $w_i$ is a local analysis window around the position of interest. The dominant local orientation of the gradients is then related to the eigenvectors of this estimated matrix. Since the gradients $z_{x_1}(\cdot)$ and $z_{x_2}(\cdot)$ depend on the pixel values ($\{y_i\}$), and since the choice of the localized kernels in turn depends on these gradients, it therefore follows that the "equivalent" kernels for the data-adapted methods of the current invention form a locally "nonlinear" combination of the data.

While this approach is simple and has nice tolerance to noise, the resulting estimate of the covariance may in general be rank deficient or unstable, and therefore care must be taken not to take the inverse of the estimate directly in this case. In such case, a diagonal loading or regularization methods can be used to obtain stable estimates of the covariance. In $$W_i(x; 0, H) = \frac{K_H(x_i - x)}{s_{11}},$$

effective multi-scale technique was proposed for estimating local orientations, which fits the requirements of this problem nicely. The current invention takes a parametric approach to the design of the steering matrix.

Figure 9:
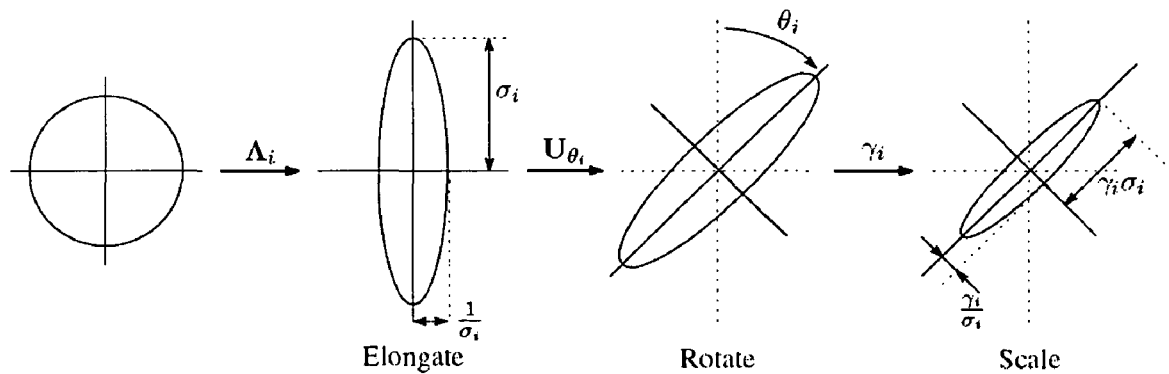
FIG. 9 shows schematic representation illustrating the effects of the steering kernel and its component (Ci=γiU₀iΛiUTθi) on the size and shape of the regression kernel according to the current invention.

In order to have a more convenient form of the covariance matrix, it is decomposed into three components (equivalent to eigenvalue decomposition) as follows:

$$C_i = \gamma_i U_{\theta_i} \Lambda_i U_{\theta_i}^T, \quad U_{\theta_i} = \begin{bmatrix} \cos\theta_i & \sin\theta_i \\ -\sin\theta_i & \cos\theta_i \end{bmatrix}, \quad \Lambda_i = \begin{bmatrix} \sigma_i & 0 \\ 0 & \sigma_i^{-1} \end{bmatrix}$$

where $U_{\theta_i}$ is a rotation matrix and $\Lambda_i$ is the elongation matrix. The covariance matrix is now given by the three parameters $\gamma_i$, $\theta_i$ and $\sigma_i$, which are the scaling, rotation, and elongation parameters, respectively. FIG. 9 schematically explains how these parameters affect the spreading of kernels. First, the circular kernel is elongated by the elongation matrix $\Lambda_i$, and its semi-minor and major axes are given by $\sigma_i$. Second, the elongated kernel is rotated by the matrix $U_{\theta_i}$. Finally, the kernel is scaled by the scaling parameter $\gamma_i$.

The scaling, elongation, and rotation parameters are defined according to the current invention as follows. The dominant orientation of the local gradient field is the singular vector corresponding to the smallest (non-zero) singular value of the local gradient matrix arranged in the following form $$G_i = \begin{bmatrix} \vdots & \vdots \\ z_{x_1}(x_j) & z_{x_2}(x_j) \\ \vdots & \vdots \end{bmatrix} = U_i S_i V_i^T, \quad x_j \in w_i,$$

where $U_i S_i V_i^T$ is the truncated singular value decomposition of $G_i$, and $S_i$ is a diagonal 2×2 matrix representing the energy in the dominant directions. Then, the second column of the 2×2 orthogonal matrix $V_i$, $v_2 = [v_1, v_2]^T$, defines the dominant orientation angle $\theta_i$:

$$\theta_i = \arctan\left(\frac{v_1}{v_2}\right)$$

That is, the singular vector corresponding to the smallest non-zero singular value of $G_i$ represents the dominant orientation of the local gradient field. The elongation parameter $\sigma_i$ can be selected corresponding to the energy of the dominant gradient direction:

$$\sigma_i = \frac{s_1 + \lambda'}{s_2 + \lambda'},$$
$$\lambda' \geq 0$$

where $\lambda_0$ is a "regularization" parameter for the kernel elongation, which dampens the effect of the noise, and restricts the denominator from becoming zero. The intuition behind the orientation parameter is to keep the shape of the kernel circular in flat area ($s_1 \approx s_2 \approx 0$), and elongate it near edge areas ($s_1 \gg s_2$). Finally, the scaling parameter $\gamma_i$ is defined by $$\gamma_i = \left(\frac{s_1 s_2 + \lambda''}{M}\right)^{\frac{1}{2}}$$

where $\lambda''$ is again a "regularization" parameter, which dampens the effect of the noise and keeps $\gamma_i$ from becoming zero; and M is the number of samples in the local analysis window. The regularization parameters $\lambda'$ and $\lambda''$ are used to prohibit the shape of the kernel from becoming infinitely narrow and long. In practice it suffices to keep these numbers reasonably small, such as equal to $\lambda'=1.0$ and $\lambda''=0.01$. The intuition behind the scaling parameter is that, to reduce noise effects while producing sharp images, large footprints are preferred in the flat (smooth) and smaller ones in the textured areas. Note that the local gradients and the eigenvalues of the local gradient matrix $\hat{C}_i$ are smaller in the flat (low-frequency) areas than the textured (high-frequency) areas according to the current invention. As $\sqrt{s_1 s_2}$ is the geometric mean of the eigenvalues of $\hat{C}_i$, $\gamma_i$ makes the steering kernel area large in the flat, and small in the textured areas.

FIG. 12 is a visual illustration of the steering kernel footprints on a variety of image structures (texture, flat, strong edge, corner, and weak edge) of Lena image for both noiseless and noisy cases. Note that in the noisy case, the shape and orientation of the kernel's footprints are very close to those of the noiseless case. Also, depending on the underlying features, in the flat areas they are relatively more spread to reduce the noise effects, while in texture areas their spread is very close to the noiseless case which reduces blurriness.

Figure 10:
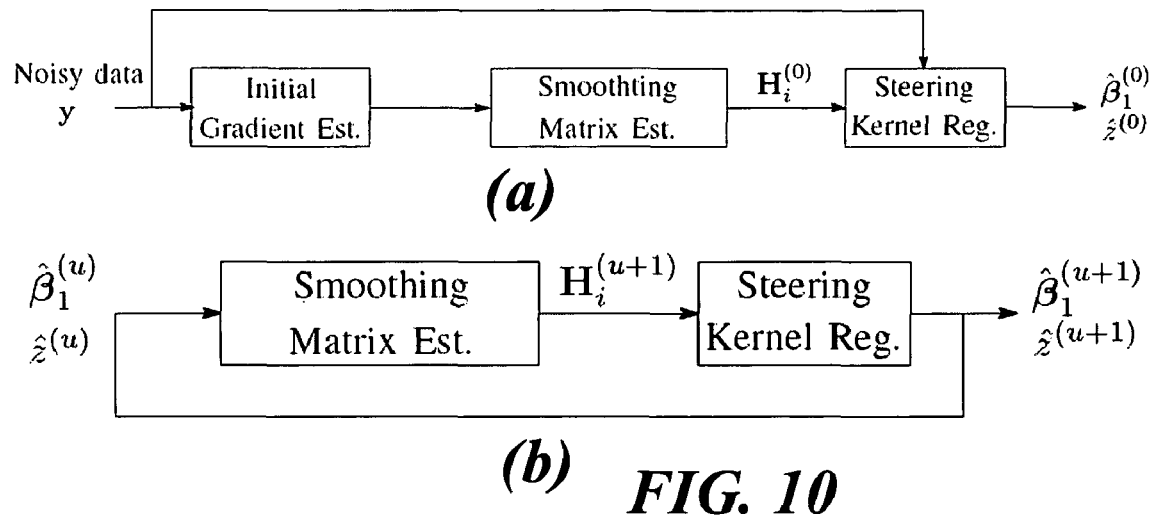
FIGS. 10a, b show a block diagram representation of the iterative steering kernel regression according to the current invention.

The estimated smoothing matrices of the steering kernel regression method in the current invention are data dependent, and consequently sensitive to the noise in the input image. In the current invention, steering kernel regression is most effective when an iterative regression/denoising procedure is used to exploit the output (less noisy) image of each iteration to estimate the radiometric terms of the kernel in the next iteration. A block diagram representation of this method is shown in FIG. 10, where u is the iteration number. In this diagram, the data sample are used to create the initial (dense) estimate of the interpolated output image (see FIG. 10(a)). In the next iteration, the reconstructed (less noisy) image is used to calculate a more reliable estimate of the gradient (see FIG. 10(b)), and this process continues for a few more iterations. A quick examination with FIG. 10(a) shows that although algorithm of the current invention relies on an initial estimation of the gradient, the estimated kernels are directly applied to the original (noninterpolated) samples which results in the populated (or denoised) image in the first iteration. Therefore, denoising and interpolation are done jointly in one step. Further iterations in FIG. 10(b) apply the modified kernels on the denoised pixels which results in more aggressive noise removal.

Figure 11:
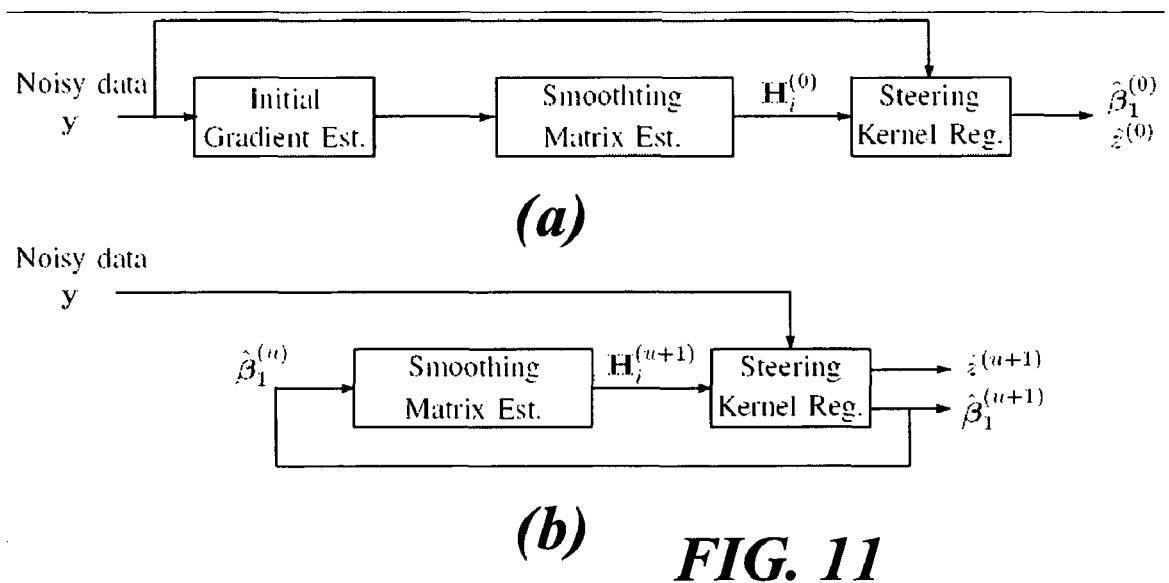
FIGS. 11a, b show a block diagram representation of an iterative steering kernel regression method according to the current invention.

FIG. 11(a) and (b) depicts an alternate embodiment of the current invention. As shown, an initial gradient estimate is done on the image or images from an original data by a appropriate method such as the second order classic kernel regression. Analysis of the local image structures is completed for computing the scaling, rotation, and elongation parameters by applying singular value decomposition to local gradient images estimated in 11(a) in order to have the steering (covariance) matrix. Steering kernel regression with the steering matrices is applied to the original data, which produces a reconstructed image and new gradient image estimates. Analysis of the local image structures is done with using the new gradient images, to obtain new steering matrices. Steering kernel regression is applied with the new steering matrices to the noisy data of the image, which produces a new reconstructed image and new gradient images. The steps of producing reconstructed images with new gradient image estimates, and applying steering kernel regression to produce new gradient images is repeated up to ten iterations. Note: The steps 1. through 3. are the initialization, and the steps 4. through 6. are the iteration.

Note that while increasing the number of iterations reduces the variance of the estimate, it also leads to increased bias (which manifests as blurriness). Therefore, in a few (typically around up to ten) iterations, a minimum mean-squared estimate is obtained. Example of this observation is shown in FIG. 13, FIG. 14, and FIG. 15.

The iterative regression method of the current invention has the luxury of using directly estimated gradients. Note that the discrete gradients used in local gradient matrix above are usually approximated by convolving a bandpass filter with the image. However, the comparison between $$z(x_i) \approx z(x) + \{\nabla z(x)\}^T (x_i - x) + \frac{1}{2}(x_i - x)^T \{\mathcal{H}z(x)\}(x_i - x) + \ldots$$
$$= z(x) + \{\nabla z(x)\}^T (x_i - x) + \frac{1}{2} vec^T \{\mathcal{H}z(x)\}$$
$$vec\{(x_i - x)(x_i - x)^T\} + \ldots$$

and $$z(x_i) \approx \beta_0 + \beta_1^T (x_i - x) + \beta_2^T vech\{(x_i - x)(x_i - x)^T\} + \ldots$$

shows that the vector $\beta_1$ is the direct estimate of the image gradient. Indeed direct estimation of the gradient vector is more reliable but at the same time computationally more expensive.

The present invention provides a method of image processing using kernel regression and image interpolation for image reconstruction. An original-data image is processed for estimating local dominant orientations of luminance created by image features, such as edges, corners and smooth areas, using a classic kernel regression technique to provide local image structure data. The local image structure data is analyzed and a scaling parameter, a rotation parameter and an elongation parameter are computed by applying a singular value decomposition to the local gradient estimates, where a steering matrix is then determined. A steering kernel regression having the steering kernel is applied to the original data and a reconstructed image outcome with new local gradients in the image is then provided. The steps of computing the scaling, rotation and elongation parameters, and applying the steering kernel regression are repeated iteratively to each new reconstructed image outcome for up to ten iterations, where each regression estimate also provides gradient estimates containing local image structure information and each iteration improves the gradients and pixel values of each successive reconstructed image to denoise the original data and improve the local image structure information in the reconstructed images. Moreover, each iteration improves not only the gradients and pixel values of each successive reconstructed image, but also the local image structure in the reconstructed images.

In one embodiment of the invention, the estimated gradient is an edge structure contains edge structure information including scaling, elongation and rotation parameters, where the estimated gradient is iteratively estimated using steering kernel regression and each iteration improves values of the pixels and the estimated gradient to provide improved edge structure information over the previous estimate.

In one aspect of the invention, the iteration directly uses estimated gradient vectors of an $i^{th}$ iteration to estimate local singular values in an ($i^{th}$+1) iteration for improved reliability.

In another aspect of the invention, an L1 norm is used in the kernel regression, where image noise has sporadic properties such as salt and pepper noise.

In another aspect of the invention the size of the steering kernel is changed using an original sample density and original image contents for making the footprint of the steering kernel bigger in image areas of low sample density, and making the footprint or the steering kernel smaller in image areas of large sample density. In another aspect of the invention, the footprint of said steering kernel is made bigger in image areas of low image structure and made smaller in areas of high image structure, where the size of the footprint of the steering kernel is determined by a scaling parameter obtained by a geometric mean of singular values of the previous image in the iteration.

In one aspect of the invention, the image denoising of the original data includes Gaussian, Film grain, and compression artifacts.

In another aspect of the invention, the image interpolation uses upscaling and image reconstruction from irregularly sampled data sets, and super-resolution.

In one embodiment of the current invention, kernel regression for image processing is used, where an image gradient from an image having original data is estimated. Local structures of the image are analyzed and a scaling parameter, a rotation parameter and an elongation parameter are computed by applying singular value decomposition to local gradients of the estimated image gradient to provide a steering kernel. A steering kernel regression having a steering kernel is applied to the original data of the image to provide a reconstructed image having new image gradients. The local image structures of the reconstructed images are analyzed and new steering kernels are provided. The steering kernel regression having said new steering kernels is applied to noisy data of the reconstructed image and a new reconstructed image is provided having further new gradients. The steps of analyzing local image structures of each new image and applying the steering kernel regression is repeated up to ten iterations to denoise original noisy data and improve the local image structure information in the reconstructed images.

Experiments on simulated and real data to demonstrate the efficacy of the current invention. In the first set of experiments, a comparison is provided to show the performance of several denoising techniques. A controlled simulated experiment is done by adding white Gaussian noise with standard deviation of $\sigma$=25 to the Lena image shown in FIG. 13($a$). The resulting noisy image with Signal to Noise Ratio7 (SNR) of 5.64 [dB], is shown in FIG. 13($b$). This noisy image is then denoised by the classic kernel regression with N=2 and h=1.8, result of which is shown in FIG. 13($c$). The result of applying the bilateral filter $$\hat{z}(x) = \frac{\sum_{i=1}^{P} K_h(x_i - x) y_i}{\sum_{i=1}^{P} K_h(x_i - x)},$$

$$K_h(t) = \frac{1}{h} K\left(\frac{t}{h}\right)$$

with $h_s$=1.5 and $h_r$=7.4 is shown in FIG. 13($d$). For the sake of comparison, the result of applying anisotropic diffusion is included and a wavelet based denoising method in FIGS. 13($e$) and ($f$), respectively. Finally, FIG. 13($g$) shows the result of applying the iterative steering kernel regression of FIG. 10 with N=2, h=2.5, and 7 iterations. The RMSE values of the restored images of (c)-(g) are 8.94, 8.65, 8.46, 6.66 and 6.68, respectively. The RMSE results reported for the (f) and (g) are the results of 35-Monte Carlo simulations.

A second controlled simulated experiment is provided by considering JPEG compression artifacts which result from compression of the image in FIG. 14($a$). The JPEG image was constructed by using MATLAB JPEG compression routine with a quality parameter equal to 10. This compressed image with a RMSE value equal to 9.76 is illustrated in FIG. 14($b$). Several denoising methods were applied (similar to the ones used in the previous experiment). The results of applying classic kernel regression (N=2 and h=1.0), bilateral filtering ($h_s$=2.0 and $h_r$=4.1), Wavelet, and the iterative steering kernel regression (N=2, h=2.0, and 3 iterations) are given in FIGS. 14($c$)-($f$), respectively. The RMSE values of the reconstructed images of ($c$)-($f$) are 9.05, 8.52, 8.80, and 8.48, respectively.

In the third denoising experiment, several denoising techniques were applied on the color image shown in FIG. 15($a$), which is corrupted by real film grain and scanning process noise. To produce better color estimates, first this RGB image was transferred to the YCrCb representation. Then several denoising techniques were applied (similar to the ones in the previous two experiments) on each channel (the luminance component Y, and the chrominance components Cr and Cb), separately. The results of applying Wavelet, and bilateral filtering ($h_s$=2.0 and $h_r$=3.5 for all channels), and the iterative steering kernel regression (N=2, h=2.0, and 3 iterations) are given in FIGS. 15($b$)-($d$), respectively. FIGS. 15($e$)-($g$) show the absolute values of the residuals on the Y channel. It can be seen that the proposed steering kernel method produces the most noise-like residuals.

The fourth experiment is a controlled simulated regression of an irregularly sampled image. 85% of the pixels in the Lena image of FIG. 13(a) were randomly deleted, creating the sparse image of FIG. 16(a). To fill the missing values, the Delaunay-spline smoother was first implemented with $\lambda$=0.087 to fill the missing values, result of which is shown in FIG. 16(b), with some clear artifacts on the edges. FIG. 16(c) shows the result of using the classic kernel regression with N=2 and h=2.25. The result of the bilateral kernel regression with N=0, $h_s$=2.25, and $h_r$=3.0 is shown in FIG. 16(d). FIGS. 16(e)-(f) show the results of implementing steering kernel regression (N=0, h=0.8, and no iterations), and (N=2, h=1.6, and 1 iteration), respectively. The RMSE values for images FIGS. 16(b)-(f) are 9.15, 9.69, 9.72, 8.91, and 8.21, respectively.

A final experiment is a multi-frame super-resolution of a real compressed color image sequence captured with a commercial video surveillance camera; courtesy of Adyoron Intelligent Systems, Ltd., Tel Aviv, Israel. A total number of 10 frames were used for this experiment, where the underlying motion was assumed to follow the translational model. One of these frames is shown in FIG. 17(a). To produce better color estimates, following [41], the RGB frames were first transferred to the YCrCb representation, and treated each channel separately. The motion vectors were estimated. Then, each channel of these frames was fused on a high-resolution grid with 5 times more pixels as illustrated in FIG. 2, interpolated the missing values, and then deblurred the interpolated image using Bilateral Total Variation regularization. The result of interpolating the irregularly sampled image by the Delaunay-spline smoother (implementation similar to the previous experiment with $\lambda$=0.28 for the luminance and $\lambda$=0.43 for the chrominance channels) followed by deblurring is shown in FIG. 17(b). The results of applying the classic kernel regression (N=2 and h=2.0 for the luminance channel and h=3.5 for the chrominance channels) followed by deblurring and the steering kernel regression (N=2, h=4.0 for the luminance channel and h=8.0 for the chrominance channels, and 1 iteration) followed by deblurring are shown in FIGS. 17(c)-(d), respectively.

Comparison of these diverse experiments shows that in general the robust non-parametric framework of the current invention results in reliable reconstruction of images with improved performance with respect to some of the most advanced methods designed specifically for particular applications, data and noise models.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example using varying orders of regression, or functions other than the Euclidean norm to penalize the residual error, or bases other than the polynomial basis alluded to earlier, can all yield generations of the present invention.

All such variations are considered to be within the scope and spirit of the present invention as defined by the following claims and their legal equivalents.

What is claimed is:

1. A method of kernel regression and image interpolation for image processing, comprising:
   a. estimating local gradients of original data in an image using a classic kernel regression technique to provide local image structure data;
   b. analyzing said local image structure data and computing a scaling parameter, a rotation parameter and a elongation parameter by applying a singular value decomposition to said local gradient estimates to provide a steering kernel;
   c. applying a steering kernel regression having said steering kernel to said original data and having a reconstructed image outcome with new local gradients in said image; and
   d. iteratively applying said steps b and c to each new said reconstructed image outcome up to ten iterations, wherein said image has said gradients containing local image structure information and each said iteration improves said gradient and pixel values of said reconstructed image, and wherein said original data is denoised and said local image structure information in said reconstructed images is improved.

2. The method of claim 1, wherein said estimated gradient contains edge structure information comprising scaling, elongation and rotation parameters, wherein said estimated gradient is iteratively estimated using steering kernel regression and each said iteration improves values of said pixels and said estimated gradient to provide improved edge structure information over a previous estimate.

3. The method of claim 1, wherein said iteration directly uses estimated gradient vectors of an $i^{th}$ iteration to estimate local singular values in an ($i^{th}$+1) iteration for improved reliability.

4. The method of claim 1, wherein an L1 norm is used in said kernel regression where image noise has sporadic properties, wherein said image noise comprises salt and pepper noise.

5. The method of claim 1, wherein a size of said steering kernel is changed using an original sample density and original image contents to make a footprint of said steering kernel bigger in image areas of low sample density and smaller in image areas of large sample density, and making said footprint of said steering kernel bigger in image areas of low image structure and smaller in areas of high image structure, wherein a size of said footprint of said steering kernel is determined by a scaling parameter obtained by a geometric mean of singular values of said image.

6. The method of claim 1, wherein image said denoising comprises Gaussian, Film grain, and compression artifacts.

7. The method of claim 1, wherein image interpolation comprises upscaling and image reconstruction from irregularly sampled data sets, and super-resolution.

8. A method of kernel regression for image processing, comprising:
   a. estimating an image gradient from an image having original data;
   b. analyzing local structures of said image by computing a scaling parameter, a rotation parameter and an elongation parameter by applying singular value decomposition to local gradients of said estimated image to provide a steering matrix;
   c. applying a steering kernel regression having a steering matrix applied to said original data of said image to provide a reconstructed image having new image gradients;
   d. analyzing said local image structures of said reconstructed images to provide new steering matrices;
   e. applying said steering kernel regression having said new steering matrices to said original noisy data of said reconstructed image to provide a new reconstructed image having further new estimated gradients; and
   f. repeating steps d and e up to ten iterations to denoise said original noisy data and improve the local image structure information in the reconstructed images.

* * * * *

UNITED STATES PATENT AND TRADEMARK OFFICE
CERTIFICATE OF CORRECTION

PATENT NO. : 7,889,950 B2
APPLICATION NO. : 11/513833
DATED : February 15, 2011
INVENTOR(S) : Peyman Milanfar et al.

Page 1 of 1

It is certified that error appears in the above-identified patent and that said Letters Patent is hereby corrected as shown below:

On the Title Page, Item (75), line 6, please amend the inventor's name "Sina Farslu" to --Sina Farsiu--

Signed and Sealed this
Tenth Day of May, 2011

David J. Kappos
*Director of the United States Patent and Trademark Office*